United States Patent [19]

Bingham et al.

[11] Patent Number: 4,597,076

[45] Date of Patent: Jun. 24, 1986

[54] DATA TRANSMISSION SYSTEM

[75] Inventors: John Bingham; Gerald P. Bassingthwaighte, both of Great Dunmow, England

[73] Assignee: International Standard Electric Corporation, New York, N.Y.

[21] Appl. No.: 658,321

[22] Filed: Oct. 5, 1984

[30] Foreign Application Priority Data

Oct. 8, 1983 [GB] United Kingdom ............... 8326989

[51] Int. Cl.$^4$ ............................................. H04J 3/02
[52] U.S. Cl. .................................................. 370/85
[58] Field of Search ......................... 370/85, 86, 100

[56] References Cited

U.S. PATENT DOCUMENTS 4,271,505  6/1981  Menot et al. .......................... 370/85

Primary Examiner—Douglas W. Olms
Assistant Examiner—Frank M. Scutch, III
Attorney, Agent, or Firm—John T. O'Halloran; Jeffrey P. Morris

[57] ABSTRACT

A data transmission system, for interconnecting a number of relatively closely-spaced user nodes, e.g. data terminals in a computer system, uses a passive bus terminated at each end by resistive terminations (T), which bus interconnects a number of system nodes (N). The nodes are identical and there is no central control to the system. To maintain synchronism between the nodes, there is a clock/sync. pulse circuit (CSS) connected to the mid-point of the bus. This enables the use of a bit rate of twice what would be possible if the source were connected to one end of the bus due to the reduced clock pulse skew effect.

3 Claims, 6 Drawing Figures

DATA TRANSMISSION SYSTEM

BACKGROUND OF THE INVENTION

This invention relates to a data transmission system, especially for use where such transmission is needed between a number of closely-spaced terminals or nodes. Such a system may be a fairly large computer installation.

According to the invention, there is provided a data transmission system, which includes a number of similar user nodes interconnected by a multi-conductor bus, impedance terminations at each of the two ends of the bus, and a clock and synchronisation pulse source included at the mid-point of the bus, the pulses generated by the source being propagated in both directions from the source to the nodes served by the system, wherein all control of the system is vested in the user nodes, so that the system does not have a central control arrangement, wherein data is conveyed in time division multiplex (TDM) manner with each time slot available when free for use by any one of the nodes, and wherein each said node includes circuitry responsive to the clock and synchronisation pulse signals to ensure that the nodes are in synchronism with each other.

BRIEF DESCRIPTION OF THE DRAWINGS

A system embodying the invention will now be described with reference to the accompanying drawings, in which:

FIGS. 3, 4 and 5, which should be fitted together with FIG. 4 to the right of FIG. 3, and FIG. 5 to the right of FIG. 4, together form a circuit diagram of a node of the system.

DESCRIPTION OF THE PREFERRED EMBODIMENT

The system to be described herein was developed to meet a requirement for the point-to-point connection of a number of low-speed start-stop terminals, with flexibility of interconnections between nodes.

The communications medium between the nodes is a nine-wire ribbon cable, the wires of which serve the following functions:

| | |
|---|---|
| (1) Power + (P+) | (6) Sync − (S−) |
| (2) Ground (G) | (7) Sync + (S+) |
| (3) Data + (D+) | (8) Ground (G) |
| (4) Data − (D−) | (9) Power − (P−) |
| (5) Ground (G) | |

Figures 1, 2:
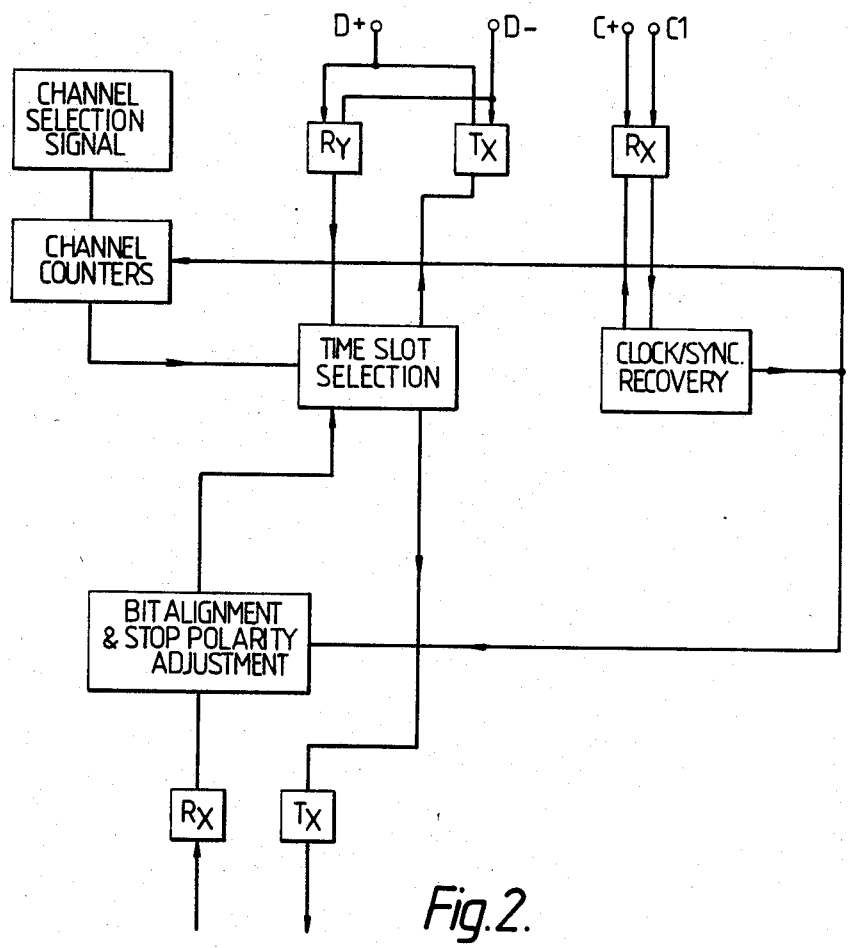
FIG. 1 is a simplified representation of the system structure.
FIG. 2 is a block diagram of one of the nodes of the system.

The nodes, one of which is shown schematically in FIG. 2, are all identical, and there is thus no central control arrangement. However, in order to establish synchronisation between the nodes, we have a single clock/sync. source CSS, see FIG. 1, which is connected to the mid-point of the bus to which all the nodes N are connected. The data and sync wires of the bus are terminated in resistive terminations, T. This use of a single clock/sync. source enables the costs of the nodes to be reduced. By placing this source CSS at the mid-point of the bus it is possible to increase the data rate which the system can handle by a factor of two, since the maximum clock skew is limited to that due to half the length of the bus.

As will be seen later the node circuitry may be readily configured for different terminal rates, by the higher data rates bein allocated additional time slots.

When a TDM channel has to be selected, the monitoring of the data bus to detect whether a channel has been allocated for use is by detecting the differential voltage on the data bus during that time slot. When a node is connected to the network its transmitter is disabled by a switch, and is only enabled when it has been established that the desired transmission channel is free. This procedure is also followed when it is required to change channels.

Channel selection involves selecting the desired transmission channel using a binary encoded switch. The node equipment automatically establishes the receive channel as the one which is 128 channel time slots removed from the transmission channel slot. Thus if channel No. 0 is chosen as the transmit channel, channel No. 128 is the receive channel, and vice versa. The full cycle contains 256 time slots, numbered 0 to 255.

Power for each node is obtained from the bus. Owing to the limited amount of current that can be handled by the ribbon cable and its connectors (usually of the insulation displacement (IDC) type) two or more power supplies distributed along the node may be needed. Thus supplies are current limiting and can be unregulated, with each node having small "on-board" regulators.

The clock and sync. signal is a 50% duty cycle square wave, which contains a broad pulse equal to 0.75 times the clock period every 256 clock periods. The sync. signal is recovered by triggering a monostable on the negative edge of the combined signal, and "ANDing" the output with the combined signal. Thus gives a sync. pulse whose leading edge occurs concurrently with the leading edge of the clock signal.

The succeeding sections of the specification give brief descriptions of the various parts of the system, with reference to FIGS. 3–6.

In the system to be described the code used is a start stop code having 10/11 units, of which eight units are data conveying elements. One is a start bit, and the others are stop bits.

CLOCK AND SYNC. RECOVERY

Figure 3:
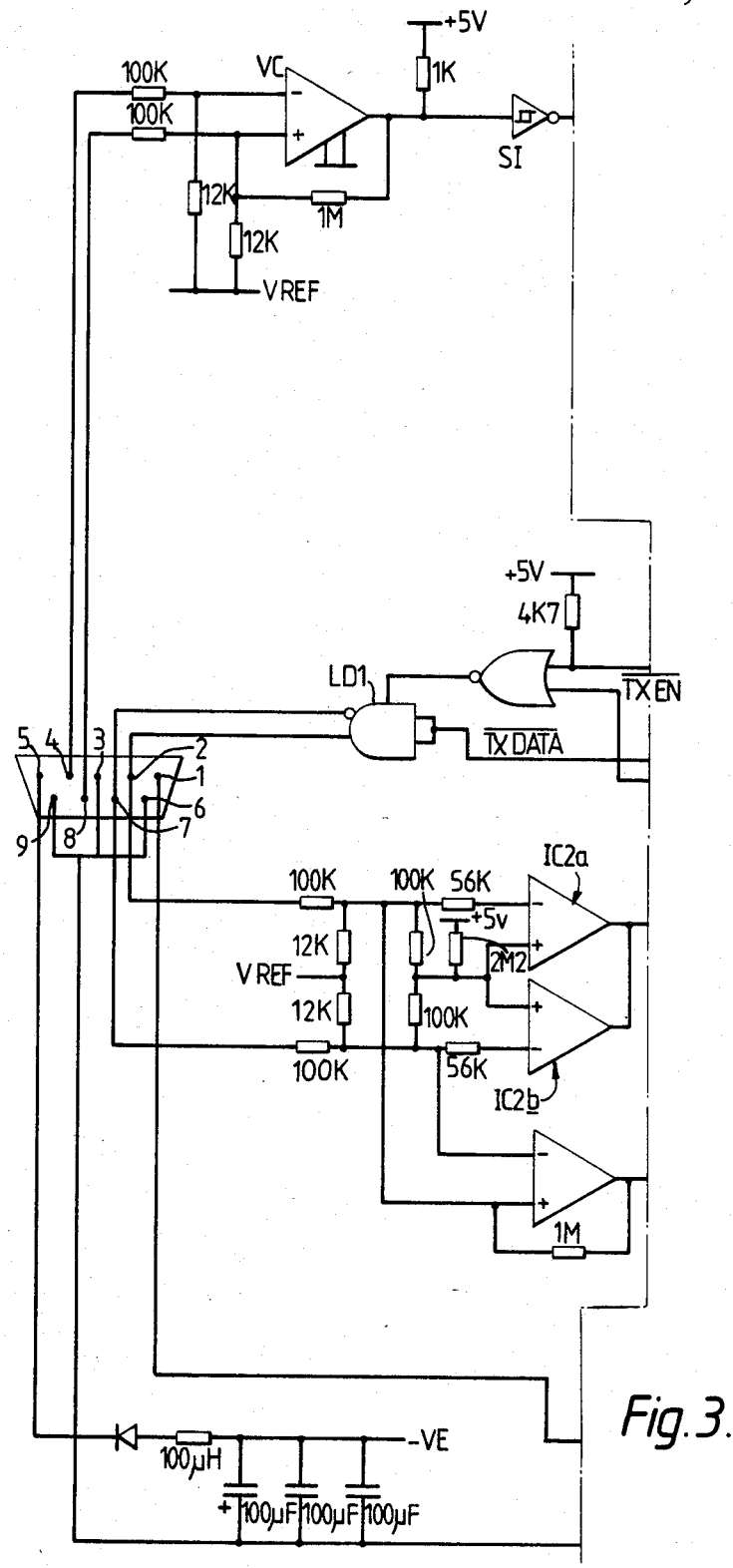
FIG. 3 illustrates the clock and synchronisation signal generation, which occupies the block CSS of FIG. 1.
Figure 4:
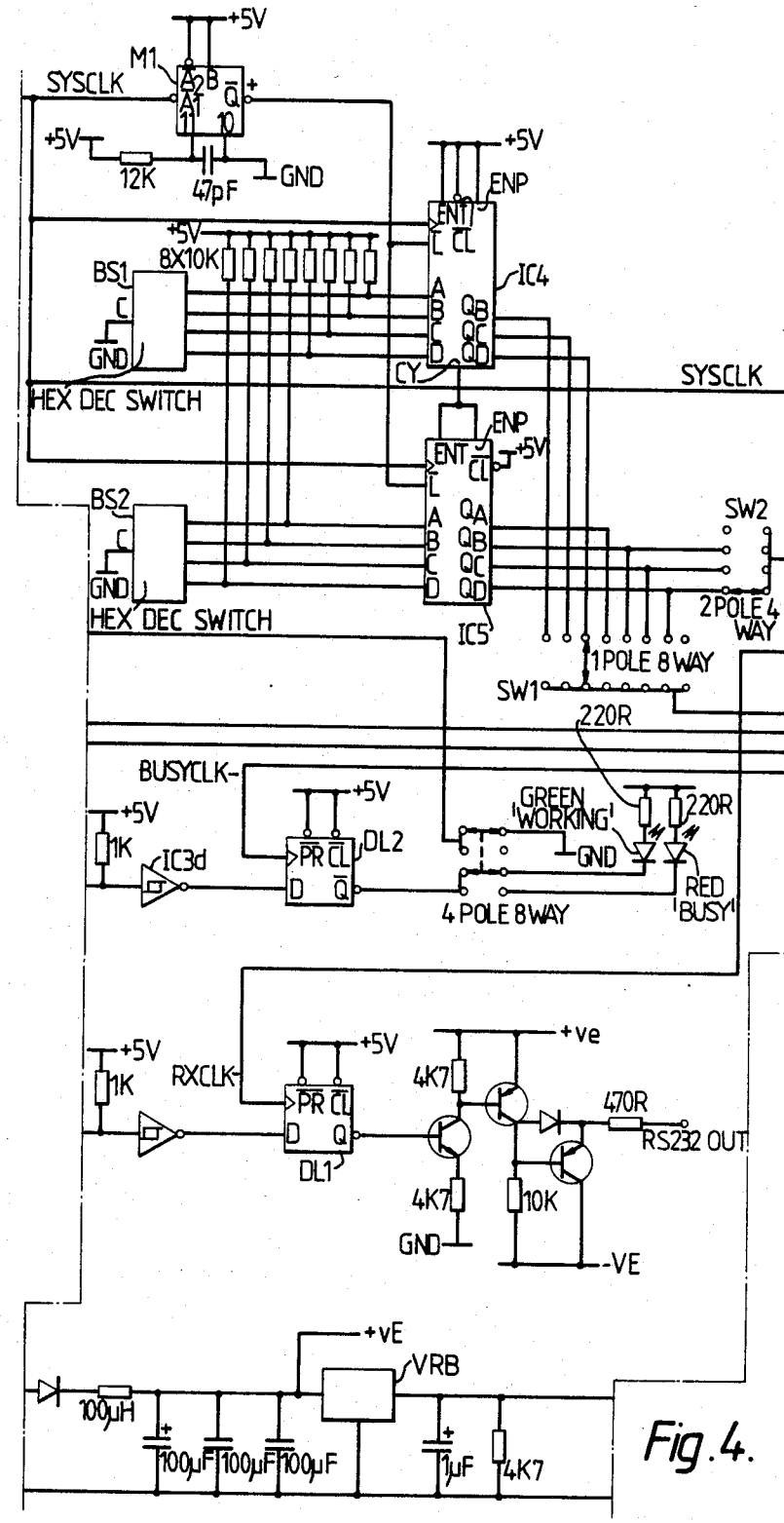
Figure 5:
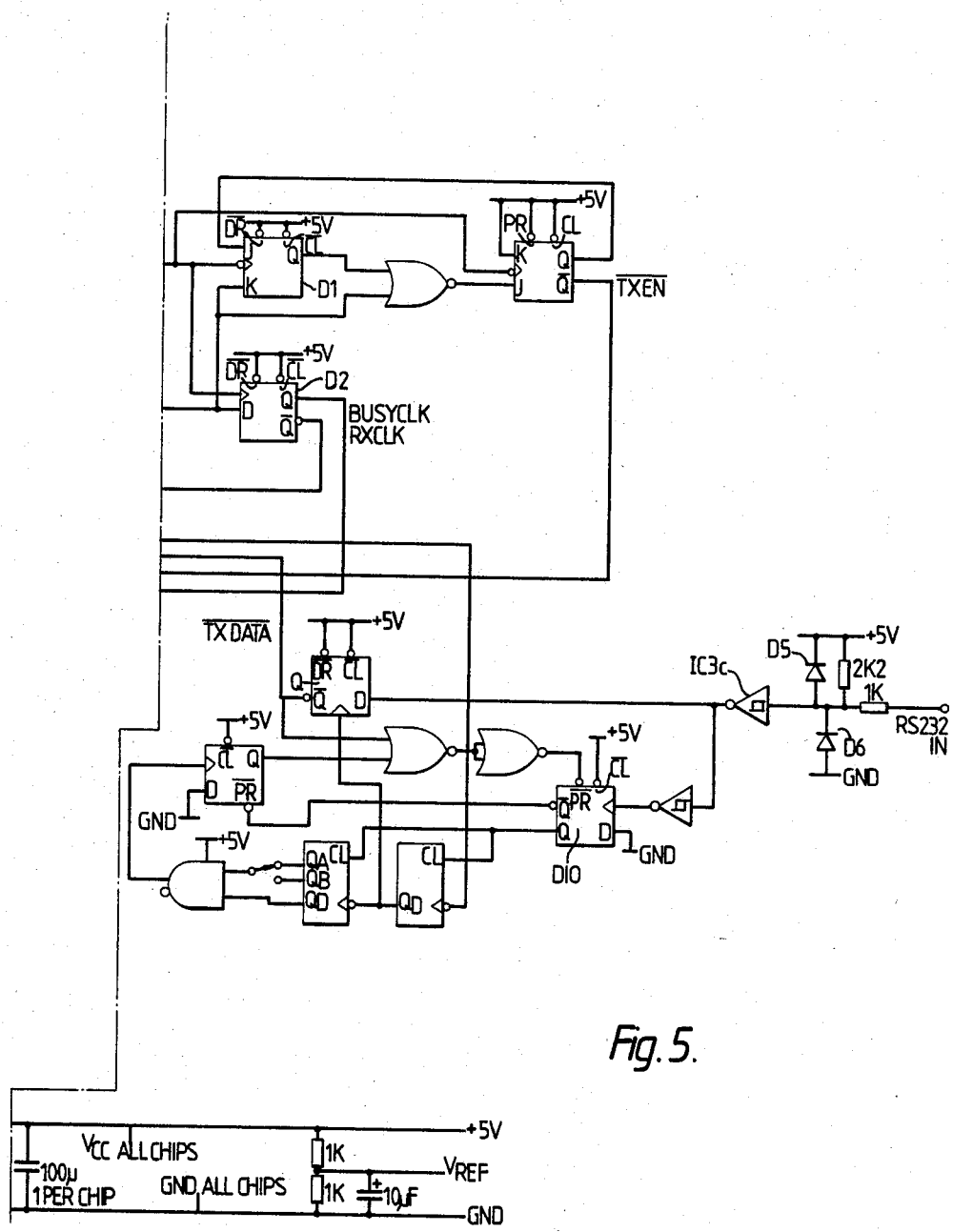
Figure 6:
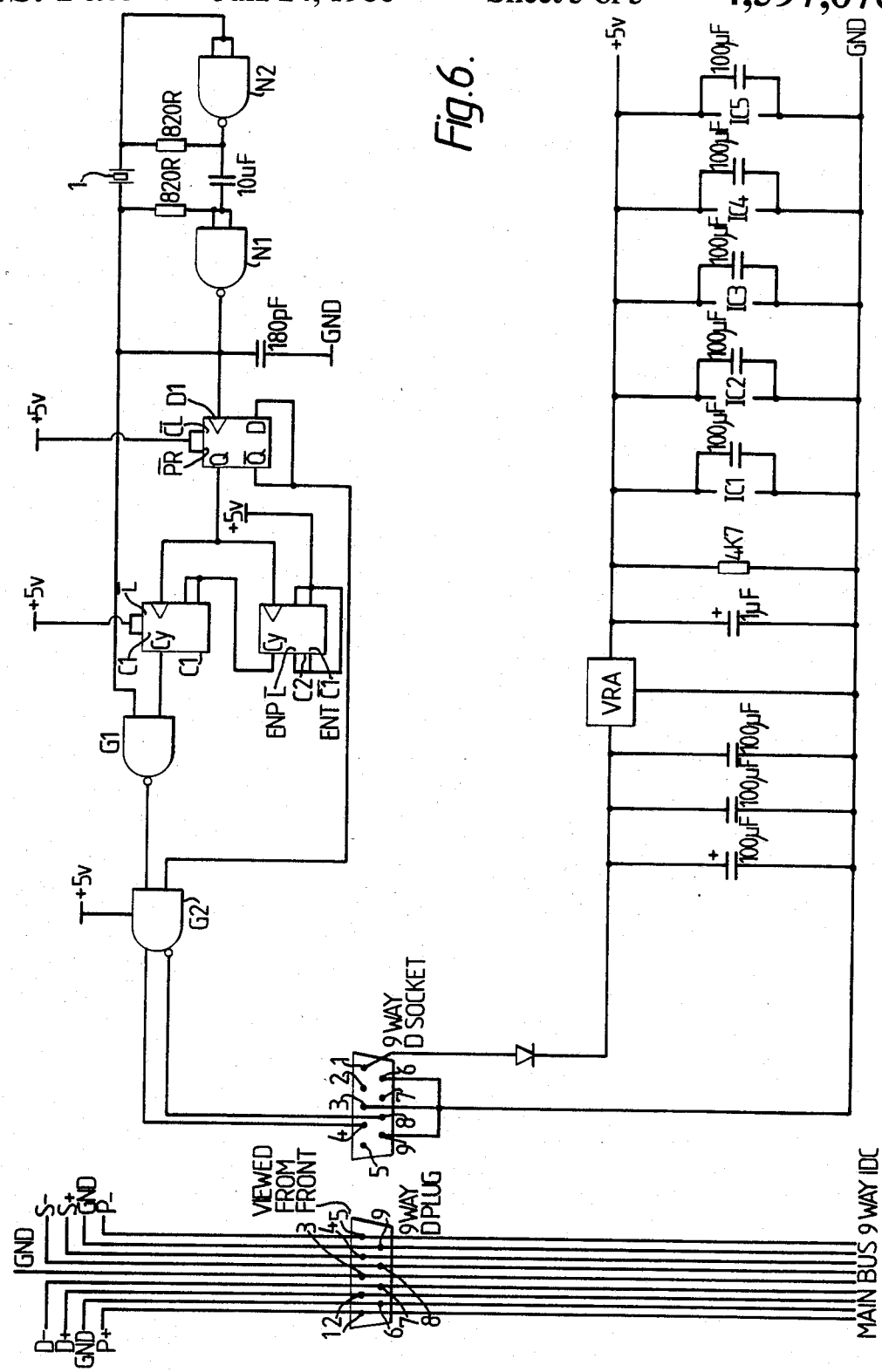
FIG. 6 is a circuit diagram of the clock module.

(FIGS. 3 and 4)

A voltage comparator VC, which is basically an operational amplifier, is used as a high impedance differential line receiver and is combined with a Schmitt trigger to recover the clock/sync. signal from the bus. This Schmitt trigger is part of the block VC. The clock signal is inverted through a Schmitt inverter SI to produce the system clock Sysck, and is also fed into a monostable M1 producing pulses of width about 0.4 of the system clock period on negative going edges of the system clock. This circuit also indluces a 5 volt regulator VRB.

CHANNEL SELECTION

(FIG. 5)

Two four-bit counters IC4 and IC5 are cascaded to form a divide by 256 counter. The system clock is fed into the clock inputs of IC4 and IC5 and the sync. signal into the load inputs of both IC4 and IC5. This causes the counter to be preset to the value given by the binary coded channel selector switches BS1 and BS2 associated with the counter every 256 clock cycles.

Channel selection is effected by using one of the higher significant bit outputs of the divide by 256 counter, depending on the baud rate.

The positive-going edge of this signal is used to produce the receive channel enable and the negative-going edge to produce the transmit channel enable. These two signals which are 128 channels apart are re-timed using D-type flip-flops D1, D2.

Sixteen times clock signals are required for the transmit circuitry and depending on the baud rate the correct one is selected from the divide by 256 counter outputs using a switch SW1,SW2. For rates higher than 4800 baud it is necessary to use more than one data channel. This is achieved by using the divide by 64 output of the 8-bit counter to produce the Tx and Rx enable signals for 9600 baud and the divide by 32 output for 19200 baud.

RECEIVER

(FIG. 6)

The data bus receiver, connected to D− and D+ pins 1 and 7, is similar to that used for recovering the clock/sync. signal from the bus. The output of the data receiver is inverted and latched into a D-type latch DL1 by the receive clock Rxck decoded from the channel selector. Some discrete components including three transistors are used to convert the signal into the internationally standardised RS232C levels.

There is some additional circuitry IC2a–IC2b etc. used to detect a whether the selected transmit channel is busy. This includes two LM319 voltage comparators IC2a–IC2b configured to provide a signal when there is no differential voltage on the data bus. This is the condition which indicates that the time slot then passing along the data bus is free. This signal is passed via an inverter IC3d to a D-type bistable DL2, where it is latched by "busy clock" derived from D2, FIG. 5. The bistable output operates an LED to give a transmit channel busy signal. Thus when a desired channel is selected an indication can be given as to whether that channel is busy.

TRANSMITTER

(FIG. 6)

Data from the terminal may be at a slightly different rate from data in the system. To remedy this the terminal data is first-level adjusted from RS232C to TTL via diodes D5-D6 and associated circuit elements, including an inverter IC3c, and then retimed to be in sync with the network clock using a D-type flip-flop D10. This retimed signal is fed onto the data bus by a differential line driver LD1 during the transmit channel enable period. This occurs under control of an input from the node's clock circuitry.

CLOCK AND SYNC GENERATION

(FIG. 6)

A 2.4576 MHz crystal 1 is used with two NAND gates N1 and N2 to form an oscillator circuit, the output of which is divided by two to give the system clock rate of 1.2288 MHz. Two four-bit counters C1 and C2 are cascaded to form a divide by 256 counter into which the system clock is fed. The output of this counter C1-C2 is gated with the output of the oscillator at G1 to provide a sync. pulse. The system clock and sync. pulse are combined together in the line driver G2, which feeds the differential clock/sync. signal onto the clock/sync. bus C−, C+. Note that the counters are fed via a D-type bistable D1. This circuit also includes a 5 volt regulator VRA.

CONCLUSIONS

It will be seen that the type of distribution network described above is a good solution for point-to-point connection of a large number of data terminals over a moderately sized area.

One current configuration of the system has 128 full duplex 4800 baud channels over a 50 meter bus. This may be reconfigured to 64 channels over a 100 meter bus by halving the system clock rate, which may be more attractive in some cases. As described, the sync. detection uses a monostable and would not work at different clock rates but if necessary the synchronisation method may be modified to make it clock rate independent.

In the nine-way ribbon cable used, three wires are designated as "grounds". It may be possible to use two of these as an additional data bus, thus doubling the capacity. No extra circuitry would be required at the nodes apart from a swtich.

Where several nodes have to be in close proximity, e.g. in a computer room, a special "multiplexer" box may be developed in which a block of channels could be allocated, say eight or sixteen and common circuitry could be used to perform the bus interfacing and channel decoding functions.

In certain cases, e.g. where interference is a problem, the ribbon cable may be replaced by coaxial cable, or even by optical fibres. In the latter case, suitable electro-optical and opto-electrical interface arrangements are needed.

It will be noted that certain of the components shown in FIGS. 3–6 are not described in detail; to one skilled in the art these components and their uses will be clear.

We claim:

1. A data transmission system, which includes a number of similar user notes interconnected by a multi-conductor bus, impedance terminations at each of the two ends of the bus, and a clock and synchronisation pulse source included at the mid-point of the bus, the pulses generated by the source being propagated in both directions from the source to the nodes served by the system, wherein all control of the system is vested in the user nodes, so that the system does not have a central control arrangement, wherein data is conveyed in time division multiplex (TDM) manner with each time slot available when free for use by any one of the nodes, and wherein each said node includes circuitry responsive to the clock and synchronisation pulse signals to ensure that the nodes are in synchronism with each other.

2. A system as claimed in claim 1, wherein said circuitry at a said node includes a counter adapted to count up to n, wherein the portion of the TDM cycle including a particular TDM time slot is one of n bits, wherein each said counter is driven by clock pulses applied from the bus to that counter's clock input, and wherein the said counters are each reset to a predetermined condition, such as zero, to maintain said synchronization.

3. A system as claimed in claim 1, wherein the data is conveyed on two conductors of said multiconductor bus, and wherein when a node needs the use of a TDM time slot the bus is monitored in search of a free time slot by connecting to the two data wires the two inputs of a differential amplifier, a time slot being detected as free when the differential amplifier finds no difference in voltage between the two wires.

* * * * *